(12) United States Patent  (10) Patent No.: US 9,239,849 B2
Forutanpour et al.  (45) Date of Patent: Jan. 19, 2016

(54) MOBILE DEVICE ACCESS OF LOCATION SPECIFIC IMAGES FROM A REMOTE DATABASE

(75) Inventors: Babak Forutanpour, Carlsbad, CA (US); Ted R. Gooding, San Diego, CA (US); David L. Bednar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 13/155,835

(22) Filed: Jun. 8, 2011

(65) Prior Publication Data

US 2012/0315884 A1  Dec. 13, 2012

(51) Int. Cl.
*H04M 3/493* (2006.01)
*G06F 17/30* (2006.01)
*H04W 4/02* (2009.01)
*H04W 4/18* (2009.01)

(52) U.S. Cl.
CPC ......... *G06F 17/30265* (2013.01); *H04W 4/026* (2013.01); *H04W 4/185* (2013.01)

(58) Field of Classification Search
USPC ................ 455/406, 414.2, 456.1–456.3, 457; 348/158, 143, 184
See application file for complete search history.

(56) References Cited

U.S. PATENT DOCUMENTS

| 7,483,957 | B2 * | 1/2009 | Sako | |
| 9,022,279 | B2 * | 5/2015 | Bolton et al. | 235/375 |
| 2005/0278749 | A1 * | 12/2005 | Ewert et al. | 725/62 |
| 2006/0164582 | A1 | 7/2006 | Kim et al. | |
| 2006/0164682 | A1 | 7/2006 | Lev | |
| 2008/0147730 | A1 * | 6/2008 | Lee et al. | 707/104.1 |
| 2008/0174676 | A1 * | 7/2008 | Squilla et al. | 348/231.6 |
| 2009/0005078 | A1 * | 1/2009 | Dariel | 455/456.2 |

(Continued)

FOREIGN PATENT DOCUMENTS

| JP | 2002300338 A | 10/2002 |
| JP | 2003224841 A | 8/2003 |

(Continued)

OTHER PUBLICATIONS

IBM: "Method to separately record photo location metadata then request matching photos to reinforce memories in case initial photo is lost or just not good", IP.Com Journal, IP.Com Inc., West Henrietta, NY, US, Jan. 4, 2010, pp. 1-2, XP013136203, ISSN: 1533-0001the whole document.

(Continued)

*Primary Examiner* — Dai A Phuong
(74) *Attorney, Agent, or Firm* — Bala M. Ramasamy

(57) ABSTRACT

Methods, systems, and devices are described for identifying images to a user. Mobile devices are used to provide position information that may be used to identify a set of images associated with the position information. The position information may include location, ordinal direction, and orientation information of the mobile device, all of which can be used to identify an object or location where a user of the mobile device desires an image. A data store of images is queried to identify a set of images having location information similar to that provided by the mobile device. Images from the set of images are provided to the user, such as through a display at the mobile device and/or a separate system such as a personal computer of the user. A user may select one or more images for local storage, in some cases making a payment for the received image.

53 Claims, 11 Drawing Sheets

(56) References Cited

U.S. PATENT DOCUMENTS

| | | | |
|---|---|---|---|
| 2009/0193021 A1* | 7/2009 | Gupta et al. | 707/6 |
| 2010/0187311 A1 | 7/2010 | Van Der Merwe et al. | |
| 2011/0173100 A1* | 7/2011 | Boncyk et al. | 705/27.1 |
| 2011/0219400 A1* | 9/2011 | Candelore | |
| 2011/0255736 A1* | 10/2011 | Thompson et al. | 382/100 |
| 2012/0057032 A1* | 3/2012 | Jang et al. | 348/207.1 |
| 2012/0194547 A1* | 8/2012 | Johnson et al. | 345/632 |
| 2013/0223744 A1* | 8/2013 | Ramanujapuram et al. | 382/182 |
| 2015/0156460 A1* | 6/2015 | Szybalski | 348/143 |
| 2015/0161258 A1* | 6/2015 | Yee et al. | 707/706 |

FOREIGN PATENT DOCUMENTS

| | | |
|---|---|---|
| JP | 2004341586 A | 12/2004 |
| JP | 2005006125 A | 1/2005 |
| JP | 2009301202 A | 12/2009 |
| JP | 2010261954 A | 11/2010 |
| JP | 2011511348 A | 4/2011 |
| KR | 20090007883 A | 1/2009 |
| KR | 20110042440 A | 4/2011 |

OTHER PUBLICATIONS

International Search Report and Written Opinion—PCT/US2012/041427—ISA/EPO—Sep. 20, 2012.

Lu Y.H., et al., "An overview of problems in image-based location awareness and navigation", Visual Communications and Image Processing; Jan. 20, 2004, San Jose, Jan. 20, 2004, pp. 102-109, XP030081276, p. 102 -105.

Snavely N., et al., "Photo Tourism: Exploring Photo Collections in 3D", Siggraph Conference Proceedings, XX, vol. 25, No. 3, Jan. 1, 2006, pp. 1-12, XP007906480, pp. 1-9.

Vertongen P.P., et al., "Location-based Services using Image Search", Applications of Computer Vision, 2008, WACV 2008, IEEE Workshop on, IEEE, Piscataway, NJ, USA, Jan. 7, 2008, pp. 1-6, XP031273486, ISBN: 978-1-4244-1913-5 page 1- page 3.

\* cited by examiner

MOBILE DEVICE ACCESS OF LOCATION SPECIFIC IMAGES FROM A REMOTE DATABASE

BACKGROUND

The following relates generally to photo access, and more specifically to access of location specific images using a mobile device. In many situations, an individual wishes to obtain an image of a certain place or object. The reasons for capturing such images are numerous, including a desire to have a visual record of an object to help in recalling a vacation, for example. Images are commonly obtained using a camera, with the user taking a picture of the place or object. Unfortunately, pictures taken with a camera may not be at the quality, lighting, or vantage point that a user may desire. For example, a user may be at a location on a rainy or cloudy day, and lighting may not be adequate for an ideal image of the place or object. Similarly, the user may not be able to access a particular vantage point to capture an image.

Mobile electronic devices, such as wireless telephones, are increasingly ubiquitous, thus providing many users with additional portable functionalities than were available in the past. Many devices include a camera that is able to capture images, and include many other features such as capabilities to run applications and access a remote network. Such devices often include a positioning system as well. Such positioning systems may include satellite-based positioning systems, such as a global positioning system (GPS) module, or one of several terrestrial-based positioning systems that commonly rely on analysis of signals received at the mobile device, or combinations of satellite and terrestrial based systems, such as assisted GPS. A mobile device may include positioning data along with a captured image.

SUMMARY

The described features generally relate to one or more improved systems, methods, and/or apparatuses for identification of images based on location information associated with the images and location information associated with a mobile device. Images may be obtained that were taken by other devices and provided to a user according to one or more of various criteria provided by the user. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

In one example, novel functionality is described for providing images to a user. A set of data is received from a mobile device, the data comprising position information including location information, an orientation of the mobile device, and an ordinal direction of the mobile device. An image database comprises a plurality of images, each having associated position information. An image identification module communicatively coupled with the network interface module and image database and identifies a set of images in the image database that correspond to the received position information. All or a portion of the set of images may be provided to the user through, for example, a display on the mobile device and/or a separate system such as a personal computer of the user.

A method for identifying images using a wireless mobile device may include receiving a set of data from the mobile device comprising position information including location information, an orientation of the mobile device, and an ordinal direction of the mobile device; and identifying a set of images associated with the received position information from a data store of images. The identifying a set of images may comprise one or more of: selecting images from the data store of images based on a number of access requests for the images; and selecting images from the data store of images based on one or more of a cost for download of the image, a resolution of the image, and a source of the image. The set of data may also include a timestamp including a date and time associated with the position information, and the set of images includes one or more images taken at a time similar to the time of the received timestamp. Also or alternatively, identifying the set of images may comprise identifying a plurality of images from times different than the time of receipt of the set of data. The set of images also may include one or more images taken by a device having position information similar to the received position information. The plurality of images may include images associated with the position information in chronological order, and the transmitting may further comprise transmitting audio associated with the chronological order of the images. The mobile device also may include an image capture module, the receiving further including receiving a captured image from the image capture module, and the identifying a set of images is further based on the captured image.

Also or alternatively, the set of images includes one or more images from other locations in the vicinity of the location information. The method may further include transmitting the other location information associated with the set of images to the mobile device. Such transmitting may comprise transmitting directions usable by a user of the mobile device to move to the other location. Identifying the set of images may be based on position information received from other mobile devices in the vicinity of the location information.

The method may further comprise transmitting the set of images to a user of the mobile device. Such transmitting may comprise transmitting one or more images to one or more of a personal video recorder, personal computer, social networking account, or mobile device associated with a user of the mobile device. Such transmitting may also, or alternatively, comprise transmitting a set of low resolution images to a user of the mobile device, receiving a selection of one or more of the images; and transmitting full resolution images of the one or more selected images. The set of low resolution images may include cost information, and the receiving a selection may comprise receiving payment of the cost of the selected one or more image.

An exemplary apparatus for identifying images to a user of a wireless mobile device, comprises: a network interface module configured to receive a set of data from the mobile device comprising position information including location information, an orientation of the mobile device, and an ordinal direction of the mobile device; an image database comprising a plurality of images having associated position information; an image identification module communicatively coupled with the network interface module and image database, and configured to identify a set of images in the image database that correspond to the received position information. The image identification module may be further configured to select images from the image database based on one or more of a number of access requests for the images, a cost for download of the images, a resolution of the images, and a source of the images. The set of images may include one or more images taken by a device having position information similar to the received position information. The set of data may further include a timestamp including a date and time associated with the position information, and the set of images includes one or more images taken at a time similar to the time of the received timestamp.

Also or alternatively, the set of images may include one or more images from other locations in the vicinity of the location information. The image identification module may be further configured to transmit the other location information associated with the set of images to the mobile device. The network interface module may be further configured to receive at least a second set of data from a second mobile device, and the image identification module further configured to identify the set of images based on position information received from the second mobile device.

The set of images may also comprise a plurality of images from times different than the time of receipt of the set of data. The plurality of images in such a case may include images associated with the position information in chronological order. The image identification module may also transmit audio associated with the chronological images.

The network interface module may be further configured to receive a captured image from an image capture device associated with the mobile device, and the image identification module further configured to identify the set of images based on the captured image. The network interface module may also be further configured to receive an image from an image capture device associated with the mobile device, and store the received image in the image database. The image database, when such an image is stored, may be configured to remove images based on one or more of an age of the image, the number of downloads of the image, and a total number of similar images contained in the image database.

The image identification module may be further configured to transmit information related to the set of images to a user of the mobile device. The information related to the set of images may comprise a set of thumbnail images, the network interface module being further configured to receiving a selection of one or more of the images, and the image identification module being further configured to transmit full resolution images of the one or more selected images. The information related to the set of images may further include cost information, and the network interface module further configured to receive a payment of the cost of the selected one or more image.

Another exemplary method for identifying images using a wireless mobile device, comprises: transmitting, from the mobile device, a set of data comprising position information including location information, an orientation of the mobile device, and an ordinal direction of the mobile device; and receiving identification of a set of images associated with the transmitted position information. The set of images may include one or more images taken by a device having position information similar to the transmitted position information. The set of data may also include a timestamp including a date and time associated with the position information, and the set of images may include one or more images taken at a time similar to the time of the transmitted timestamp. The method may also include receiving, at the mobile device, information related to a second location in the vicinity of the location of the mobile device, corresponding to one or more images in the set of images.

Also or alternatively, the set of images may comprise a plurality of images from times different than the time of transmission of the set of data. The method may also include displaying, at the mobile device, the plurality of images in chronological order, and may also include playing, at the mobile device, audio associated with the plurality of images.

The method may further include receiving, at the mobile device, a set of low resolution images corresponding to the set of images; receiving a selection of one or more of the images; transmitting full resolution images of the one or more selected images; and capturing an image from an image capture module of the mobile device when a selection of one or more of the images is not received.

An exemplary a mobile device comprises a positioning module configured to determine a location, an ordinal direction, and an orientation of the mobile device; and a controller module communicatively coupled to the positioning module that is configured to transmit a set of data comprising position information including location information, an orientation of the mobile device, and an ordinal direction of the mobile device. The controller module may be further configured to: receive identification of a set of images associated with the received position information from a data store of images; monitor an output of the positioning module and transmit the set of data when a predefined motion of the mobile device is detected; receive configuration information related the mobile device that identifies a particular portion of the mobile device as the front of the mobile device and transmit the orientation of the mobile device and the ordinal direction of the mobile device based on the configuration information; receive information related to a second location in the vicinity of the location of the mobile device, corresponding to one or more images in the set of images; and/or receive one or more images of the set of images independently of a request from a user to receive the one or more images. The set of images may include one or more images taken by a device having position information similar to the transmitted position information; and/or a plurality of images from times different than the time of transmission of the set of data. The mobile device may include a display configured to display the plurality of images in chronological order.

An exemplary system for identifying images using a wireless mobile device, comprises: means for receiving a set of data from the mobile device comprising position information including location information, an orientation of the mobile device, and an ordinal direction of the mobile device; and means for identifying a set of images associated with the received position information from a data store of images. The means for identifying the set of images may comprise means for selecting images from the data store of images based on a number of access requests for the images. The set of images may include one or more of: images taken by a device having position information similar to the received position information; and images from other locations in the vicinity of the location information that may be of interest to a user of the mobile device. The means for identifying the set of images may comprise means for identifying a plurality of images from times different than the time of receipt of the set of data.

An exemplary computer program product comprises computer readable medium comprising: code for receiving a set of data from the mobile device comprising position information including location information, an orientation of the mobile device, and an ordinal direction of the mobile device; and code for identifying a set of images associated with the received position information from a data store of images. The code for identifying the set of images may comprise code for selecting images from the data store of images based on a number of access requests for the images. The set of images may include one or more of: images taken by a device having position information similar to the received position information; and images from other locations in the vicinity of the location information. The code for identifying the set of images may comprise code for identifying a plurality of images from times different than the time of receipt of the set of data.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Mobile devices are used to provide position information that may be used to identify a set of images associated with the position information. The position information may include location, ordinal direction, and orientation information of the mobile device, all of which can be used to identify an object or location where a user of the mobile device desires an image. A data store of images is queried to identify a set of images having location information similar to that provided by the mobile device. Images from the set of images are provided to the user, such as through a display at the mobile device and/or a separate system such as a personal computer of the user. Various information may be provided along with the images, such as descriptive information related to the particular object or location of the images, and audio that may accompany the images, for example. A user may select one or more images for local storage, in some cases making a payment for the received image.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
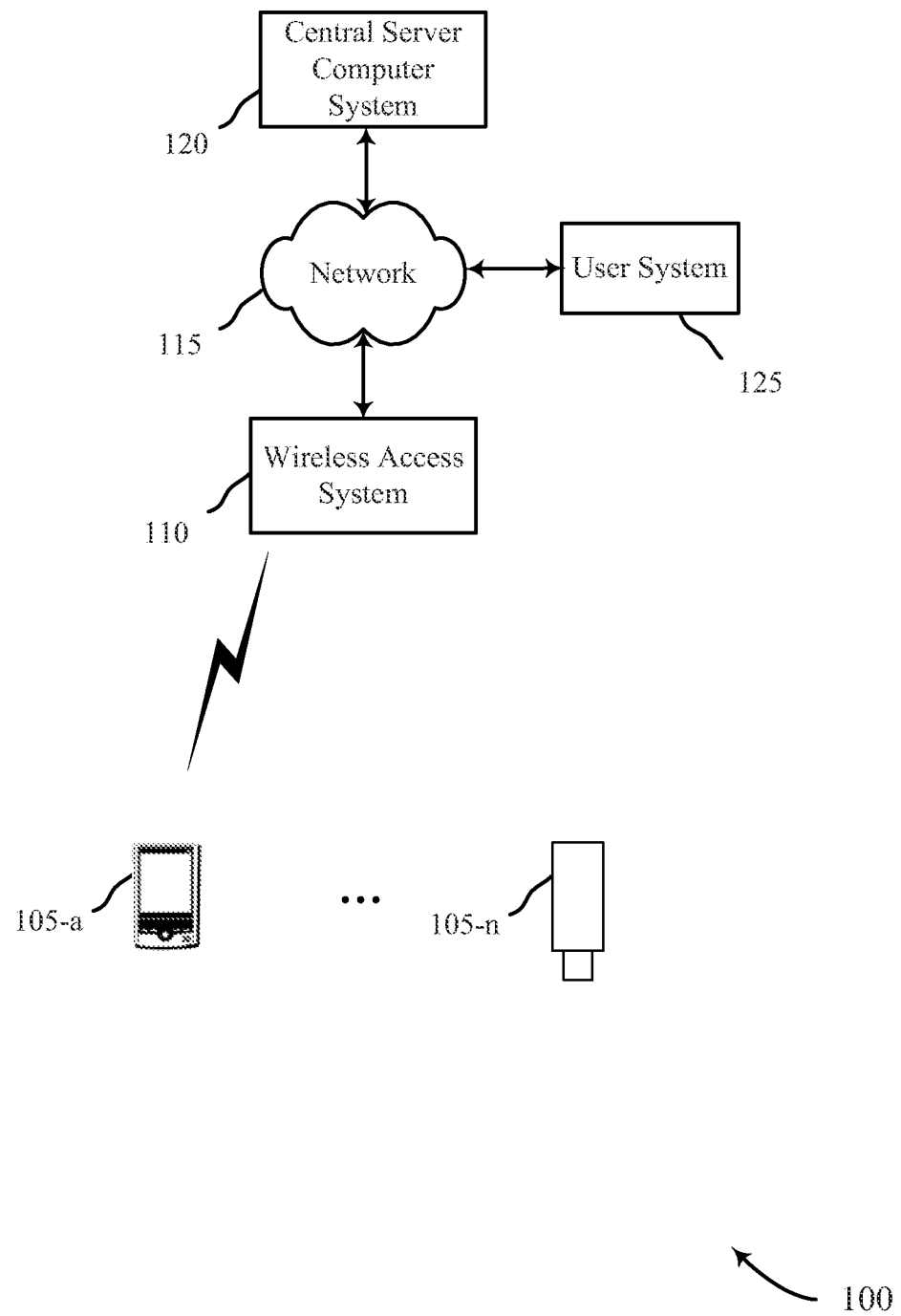
FIG. 1 shows a block diagram of an exemplary communications system.

Referring first to FIG. 1, a block diagram illustrates an exemplary system 100 that includes a number of mobile devices 105. A mobile device 105 may be one of a number of devices, such as a smartphone, a cellular phone, a VoIP phone, a personal digital assistant, a tablet computer, a laptop computer, a portable digital music player, or other mobile device that communicates voice and/or data, or any combination of the foregoing. It will be readily understood that a mobile device may include any suitable device capable of operating to perform the functions for identifying images as described herein, and the particular components illustrated in FIG. 1 are for purposes of illustration and discussion of general concepts described herein. In some cases, for example, the mobile device may be a dongle type device or a device that may be worn or carried by a user such as on a ring, pendant, bracelet, or pen, for example. In cases where the mobile device is a dongle or other type of device carried or worn by a user, the device may not necessarily include all of the components of a traditional cellular phone or PDA, and may not, for example, provide voice communications, have a user display, and/or have wireless communications capability. A user may use the dongle or similar device to collect position information that is to be used to identify images, and plug the dongle into a computer for use in identifying desired images. Other types of devices may be capable of short range wireless communications such as through Bluetooth™ communications or wireless LAN communications such as through the IEEE 801.11 standard. In some cases, a mobile device 105 may include a relatively small display, a position sensor system, and a wireless data communications system. In still other cases, a mobile device 105 may not have internal storage for images, and a user may provide an input that an image is to be obtained for the current position information, which causes an image of the location to be transferred to a pre-established account of the user, such as a social networking account. Of course, the mobile device may be a feature rich smartphone capable of running an application that performs various functions for identifying images as well, and it is to be understood that the concepts described herein may be implemented using numerous different types of mobile devices.

The mobile devices 105, in the example of FIG. 1, may connect to a wireless access system 110 through a wireless network. Such a wireless network may include any suitable wireless network capable of transmitting data on any of a number of different wireless protocols. Such networks are well known and need not be described in further detail here. The wireless access system 110 is interconnected to a network 115 such as, for example, the Internet, which has other network attached components. A central server computer system 120 is connected to the network 115 and performs functions related to identification of images based on position information received from mobile devices 105. The central server computer system 120 may, for example, be made up one or more server computers, personal computers, workstations, web servers, or other suitable computing devices, and the individual computing device(s) for a given server may be local or remote from each other. In various examples, the central server computer system 120 receives position information along with user requests to initiate the identification of images that are associated with the location of the mobile device 105. The position information from the mobile device 105 may be used in a query to a data store of images to identify images associated with the received position information. The identification of images is made according to various criteria, as will be described in more detail below.

A user system 125 is also connected to the network 115. Such a user system 125 may be another point of user access to images from the data store of images, and/or may be used by a user to define the parameters of desired images, such as by providing data identifying a minimum quality of images, specified time periods of the image acquisition, specified lighting conditions, and a maximum cost of the image if present, to name nut a few examples. There are a number of ways in the central server computer system 120 may identify a set of images, various examples of which will be described in more detail below.

Figure 2:
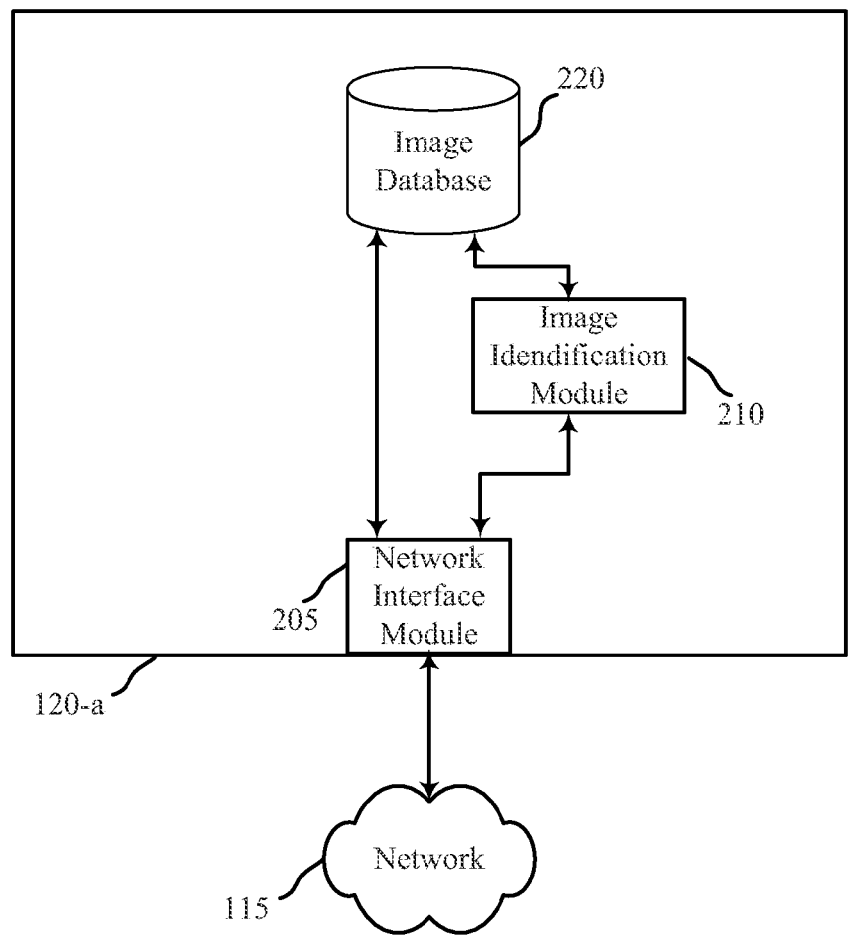
FIG. 2 shows a block diagram of an exemplary central server computer system.

With reference now to FIG. 2, an example of a central server computer system 120-*a* is described. A network interface module 205 provides an interconnection between components of the central server computer system 120-*a* and the network 115. An image identification module 210, and an image database 215 are interconnected in the central server computer system 120-*a* of this example. When a request to identify images is received at the central server computer system 120, the request is passed to the image identification module 210, which performs functions to query the image database 215 based on the contents of the request. The image database 215 includes information storage that may be retrieved, modified, and/or stored by the image identification module 210, including, for example, data identifying a location associated with each image, information about the time each image was acquired, quality information associated with the images (such as resolution), and information on the cost of the images. For example, a mobile device user may desire to obtain images of a particular object, such as the U.S. Capitol Building in Washington D.C., and uses a mobile device to initiate the request. Position information from the mobile device may be passed to the image identification module 210 that is used to identify that the user desires images of the U.S. Capitol building, and a query is made to the image database 215 to identify such images.

Figure 3:
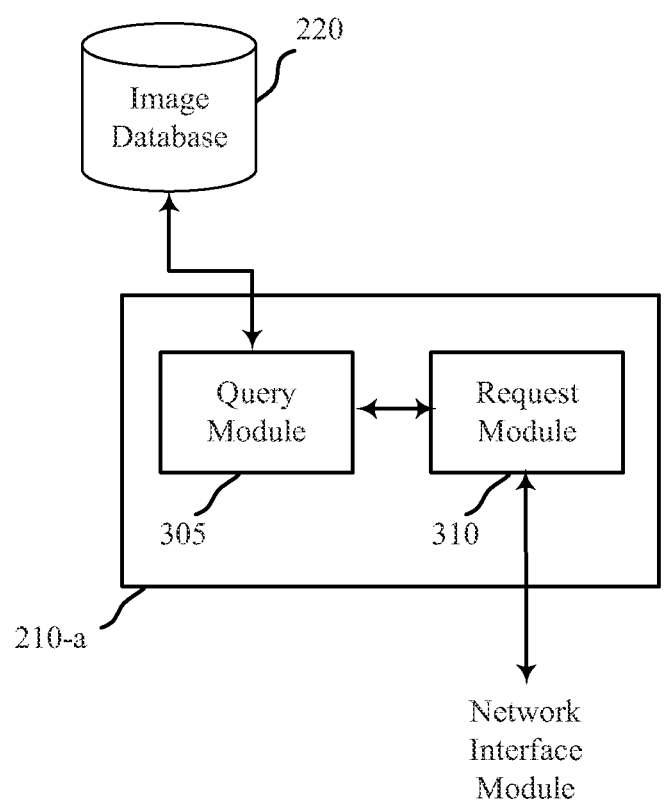
FIG. 3 shows a block diagram of an example of an image identification module.

With reference now to FIG. 3, a block diagram illustration of an image identification module 210-*a* is described for an exemplary implementation. Image identification module 210-*a* includes a request module 305, and a query module 310. The request module 305 is connected to the network interface module and operates to receive image requests, formulate queries that are provided to the query module 310, receive results from the query module 310, and transmit results to a user through the network interface module. The request module 305 may use one or more of various criteria to formulate a query, including position information provided from a mobile device. The request module 305 of FIG. 3 receives position information that includes a location of the mobile device, an ordinal direction of the mobile device, and an orientation of the mobile device. Location information may include typical information as provided from a positioning system, such as latitude and longitude information as may be provided according to a coordinate system such as WGS84. Ordinal direction information may include information from a compass component within the mobile device, and provides an angular direction relative to magnetic north for the mobile device. Orientation information may include information from a three-axis accelerometer within the mobile device, and provides an angular orientation for the mobile device. The position information thus provides the location of the mobile device, which direction the mobile device is pointing, and the orientation of the mobile device such as toward something overhead or towards the ground. In such a manner, the general "frame" of a theoretical image taken from the mobile device may be determined.

The request module 305 of various examples receives other information with the request from the mobile device, such as user preferences for images that are returned from a request. Such preferences may include image quality or resolution criteria, image timeframe criteria, and image cost criteria (e.g., do not display images that cost more than $1.00), to name just a few examples. Preferences may also include default values for various criteria that are set to provide images that may be desired by a majority of users. The request module 305 formulates one or more queries based on the position information and preference information, and provides the one or more queries to query module 310. The request module 305 may also receive an image taken by the mobile device, and a query request generated that includes the image and a user preference for returned images having similar objects and framing but with better or different resolution or lighting, for example. Query module 310 searches images in the image database 220 for images that meet the criteria of the query request. Images in the image database 220 may include several items of information related to the image, such as, for example, position information of a device that captured the particular image, a date and time of the image, image quality and resolution, and cost of the image. The query module 310 provides the results from the query to the request module 305, the results including one or more images that meet, or are the closest matches to, the criteria of the query request. Query module 310, in some applications, selects images from the image database 220 based on the criteria of the query request and a frequency of requests to download a particular image. The query module 310 may also include prioritization information to prioritize returned images based on a source of the image, such as sources from whom the user has purchased images in the past, or sources that the user knows socially or have relatively few degrees of separation from the user on one or more social networking sites. The query module 310 may also select images from the image database based on images of from multiple users of the system are taking pictures of the same item and event and in relatively close proximity to the user. In such a case, numerous images may be available for a particular event and location, providing a user related images of a missed opportunity, such as a particular catch at a sporting event for example, and thereby allowing the selection of images from a similar vantage point to the user. The request module 305 then transmits the results to the requesting user. The results may be transmitted to the requesting user in any of a number of manners, such as by transmitting the images to the user's mobile device, to the user's personal computer, to a user account at a social networking site, and/or to a digital video recorder associated with the user. The images may be transmitted as thumbnail images or as images of reduced quality for review by the user, and the user may select one or more of the images for a full download, in some cases making a payment for the full download.

Some users may capture images using a mobile device or camera for example, and upload the images along with the position information and other related information to the image database 220. The uploading user may also specify a cost for the image, and when the user's uploaded images are downloaded the user receives payment for the image. The user in such cases may provide cost information along with the image, or cost information may be preset for the user as a part of the user's preferences, such that the user receives the specified payment whenever the image is downloaded by another user. In situations where numerous images are uploaded by different users, duplicative, older, and/or unpopular images may be removed from the database. For example, if several thousand images of a landmark are present in the image database 220, and a user identifies another image to be uploaded, one or more images may be removed that are older than a definable age and (i) have had relatively few downloads, and/or (ii) have similar position, orientation, and time of day information. In such a manner, the total storage requirements of the image database 220 may be managed. The maximum number of images, and criteria for removal of images, may be configured based on various different criteria, such as the number of image downloads from a particular location, popularity of the location, and historical significance of a location, to name but a few examples.

Figure 4:
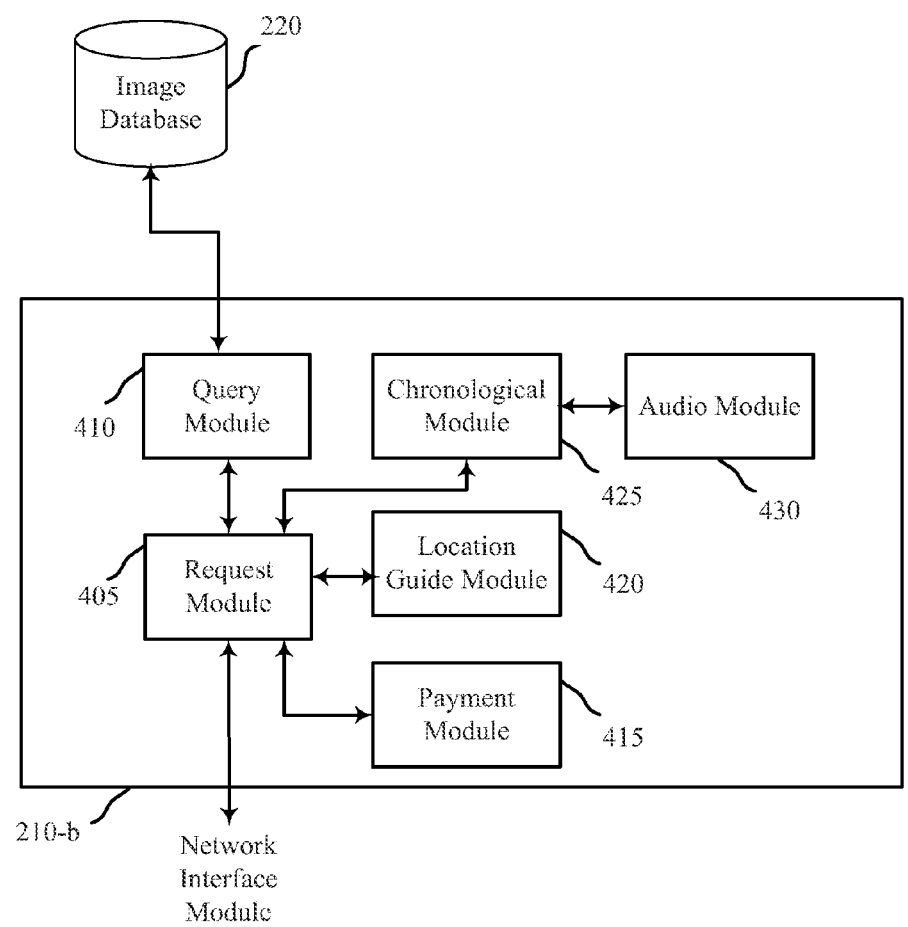
FIG. 4 shows a block diagram of another example of an image identification module.

As will be readily recognized by one of skill in the art, numerous variations of requests may be made by a user. In various examples, the image identification module 210 (FIG. 2) includes one or more modules that may be used to provide unique sets of images based on user requests. FIG. 4 is a block diagram illustration of one such exemplary image identification module 210-*b*. In FIG. 4, the image identification module 210-*b* includes a request module 405 that is coupled to a query module 410, which may operate in a similar manner as described with respect the modules of to FIG. 3. Also coupled to the request module 405, in this example, are a payment module 415, a location guide module 420, and a chronological module 425. As discussed above, a user may make a payment for one or more selected images. Payment module 415, in this example, is coupled to the request module 405 and processes payment information. For example, a user of the system may have a user account that is set up with user preferences and also includes prepaid balance or information to use in charging another account of the user, such as a bank account or credit card account. Similarly, as mentioned above, users in some cases may provide images for download by other users and receive payment for each image download, and payment module 415 may perform the transactions to transfer payment from the requesting user's account to the account of the user that provided the image. Furthermore, users may make a payment for each request submitted to the system, or for requests beyond a monthly quota for example, with the payment module 415 processing such payments.

With continued reference to FIG. 4, the illustrated image identification module 210-*b* includes a location guide module 420. The location guide module 420 is coupled to the request module 405, and may provide one or more of several location-based queries. In one example, the location guide module 420 formulates queries to be passed through the request module 405 to the query module 410. The queries may include queries for images that were taken within a predetermined vicinity of the location information received at the request module 405. The location guide module 420 may receive the results of such queries, analyze the results, and determine information related to other locations within the predetermined vicinity that have a relatively high number of images in the image database 220. This other location information may be provided to a user who may desire to view the images, or move to one or more of the identified other locations. For example, a visitor to a location may submit an image request at a first location, and the location guide module 420 may determine that other users that make similar image requests, or that upload images to the image database 220, also commonly make requests or uploads, at other nearby locations. The location guide module 420 may provide this information to the request module 405 for transmission to the user. The mobile device of the user may then display to the user information on the other nearby location(s) that the user may wish to visit. The display may be an arrow or other graphic display to provide the user in indication that they may want to visit the nearby location. Thus a visitor to Washington D.C. may request or take an image of the Lincoln Memorial, and the location guide module 420 may determine that a certain percentage of users who take or request images having that position information also take or request images at the nearby Washington Monument, or that many users that request or take an image of the Washington Monument at a certain location also take or request an image directly adjacent to the Washington Monument facing upward to the top of the Monument. This other location information may be provided to the request module 405 to be transmitted to the user, who may then identify other nearby locations that may be of interest. Similarly, the location guide module 420 may operate on a real-time or near real-time basis, and the location guide module 420 may identify a nearby location having a significant amount of current activity. For example, a user taking an image of the Washington Monument may be alerted to an impromptu visit by an elected official or visiting dignitary to the nearby Lincoln Memorial based on a significant amount of current images currently being taken or requested at that nearby location. In other examples, the location guide module 420 may generate periodic queries for images to be displayed to a user such as, for example, when a user is travelling in a vehicle through an area and wishes to receive images associated with locations relatively nearby to where the vehicle is located at any particular time.

The image identification module 210-*b* of FIG. 4 also includes a chronological module 425 that is coupled to the request module 405. The chronological module 425 may receive position information from the request module 405 and use the information to formulate one or more queries to identify images having the received position information and that were taken at different times. The chronological module 425 may receive identification of such images and, based on one or more selection criteria, identify images from various different chronological times that may be transmitted to the user through the request module 405. Such chronological times may correspond to different seasons of the year, different times of the day, or different historical times. For example, continuing with the Washington D.C. visitor, a user may wish to obtain an image of the U.S. Capitol, and also view images of the U.S. Capitol during different seasons of the year. The chronological module 425 in such a case would receive the image request from the request module 405, and formulate one or more queries to identify images that fit the selection criteria of images from different seasons. The set of images generated from the query could then be transmitted to the user for viewing and possible selection for full download. Thus, if the user was visiting Washington D.C. in the summer, the identified images could include images from spring, autumn, and winter, as well as images taken during the summer. The user may desire to keep one or more of these images, and select the desired image(s) for full download upon any required payment for the selected image(s). Similarly, the user may desire to view historical images of the U.S. Capitol. In such a case, the chronological module 425 may formulate one or more queries to identify such historical images from the image database 220. The historical images may date back many years, to some of the earliest available images through to images taken in the present day. The identified images may be transmitted to the user according to any suitable mechanism, and viewed by the user in chronological order. If the user is using an application running on a mobile device or computer to view the images, a timeline may also be provided to give the user additional visual information on the different images through time.

In the example of FIG. 4, the chronological module 425 is also coupled to an audio module 430 that matches audio corresponding to the images identified by the chronological module 425. Audio may be selected and matched to images based on any of a number of selectable criteria, such as audio from a particular musical genre, popular music from the time that a particular image of set of images was taken, or audio associated with a particular image such as a speech given at the location. Of course, numerous different audio or selection criteria may be used. For example, audio and the set of identified images in chronological order may be delivered to a user's mobile device, computer, or DVR for playback and viewing. Chronological module 425 may also formulate queries and filter results from the image database 220, and/or other available resources that may be accessed through the network interface module, to provide other information related to one or more particular images, such as (i) documents providing additional details about a particular place, object, person, or event, associated with an image, (ii) video segments associated with an image, or (iii) other media associated with an object, person, or event associated with an image.

Figure 5:
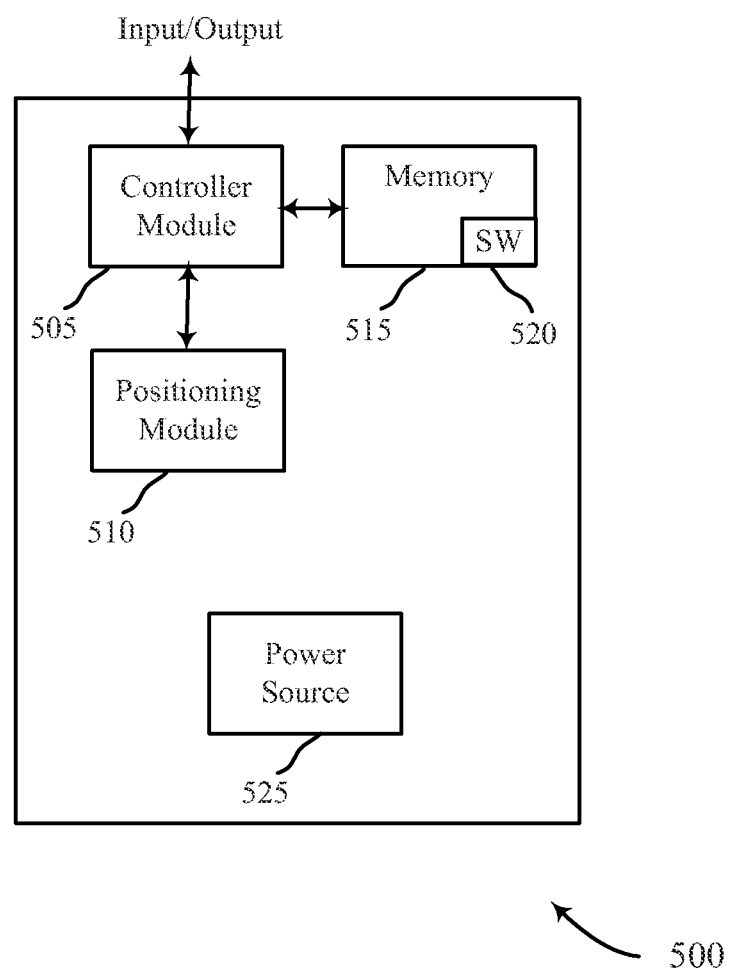
FIG. 5 shows a block diagram of an exemplary wireless device.

With reference now to FIG. 5, an exemplary mobile device 500 is described. The mobile device 500 of FIG. 5 includes a controller module 505, a positioning module 510, a memory 515 having software code 520 stored therein, and a power source such as a rechargeable battery. The controller module 505 obtains information from the positioning module 510, which may be provided to an external system (such as central server computer system 120 of FIG. 1) through an input/output to, for example, a wireless access system (such as system 110 of FIG. 1) if the mobile device 500 has wireless communication capability, or through connection to a user system (such as user system 125 of FIG. 1). The positioning module 510 contains components that provide location, orientation, and ordinal direction information for the mobile device, and an example of which is described below. The mobile device 500 may be a dongle-type device that is plugged into a USB port, or similar communication port, on a computing device. Similarly, the mobile device 500 may be a device that is carried or worn by a user, and included on a pendent, ring, bracelet, pen, or other item that may be work or carried by a user. Such a mobile device 500 may not include a camera, a display or other communications device, or even have a user interface. For example, a mobile device 500 may be embodied in a dongle-type device that a user may wear as a pendant around their neck. The software code 520 may be programmed to cause the controller 505 to monitor for user input that indicates the user wishes to obtain one or more images associated with the particular location. User input may be through a button on the mobile device 500, or may be a predetermined movement of the mobile device 500, in which case the controller module 505 monitors the output of the positioning module 510 to recognize the predetermined movement as the user input. For example, the mobile device 500 may be included in a ring or pendant worn by a user, and the act of tapping the mobile device 500 as the user's hand is extended will cause an image to be transferred to the mobile device 500.

In cases where the mobile device does not have a display and/or memory, an image may be transferred to a predefined user account, such as a social networking account of the user. In such a manner, the user may simply carry a small and easily portable device and record locations where an image is desired. The user may point the mobile device 500 at a particular object or area, press a button on the mobile device 500, or move the mobile device in a predetermined motion to signal the controller module 505 that an image is desired. The controller module 505 then obtains position information from positioning module 510 and stores the information in memory 515. When movement of the mobile device 500 is used for providing user input to obtain an image, the motion may be one of many distinct movements, such as holding the device pointing toward an object of interest, and turning the device to rotate to the left about ninety degrees and then to the right about ninety degrees. The controller module 505 can monitor the positioning module 510 output and when the predetermined movement is detected, record the position information of the device. In examples where the mobile device 500 does not have a display or a predefined "front" and "rear," the mobile device 500 may be configured to have a certain behavior with respect to the "front" of the device that is uses as a basis for the direction and orientation of the device that is to be used to obtain images. The user may at a later time connect the mobile device 500 to another device configured to receive the stored position information and transmit the position information to obtain a set of images from a system such as described above for each of the image capture events stored in the memory 515.

Figure 6:
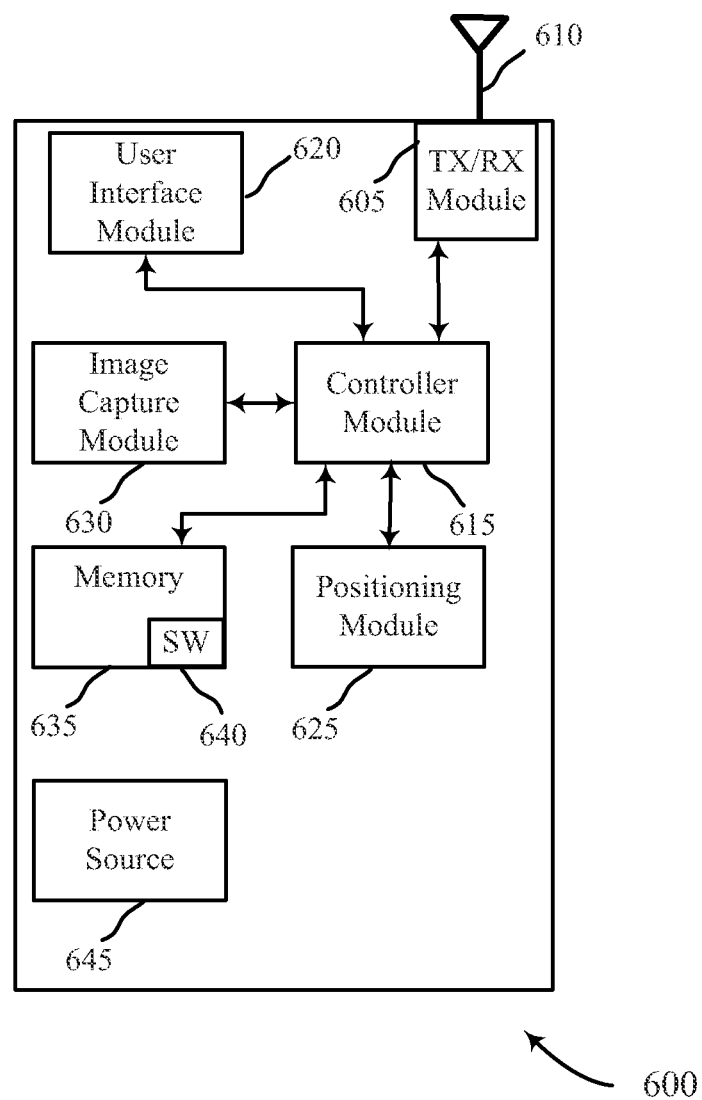
FIG. 6 shows a block diagram of another exemplary wireless device.

Of course, a wireless mobile device, such a mobile telephone or tablet computer, may also be used in a manner to obtain images as described above. FIG. 6 is a block diagram illustration of an exemplary mobile device 700, which is a wireless mobile device that may be used to obtain a set of images corresponding to a position of the mobile device 600. In FIG. 6, the mobile device 600 includes a transmit/receive module 605 coupled to one or more antennas 610 that may be used to communicate over a wireless network. A controller module 615 is coupled to the transmit/receive module 605 and to a user interface 620. The user interface 620 may include any suitable user interface commonly found on such mobile devices 700, which may include a display, microphone, speaker(s), keypad and/or touch-screen. A positioning module 625 is also coupled to the controller module 615, and outputs position information to the controller module 615. The positioning module 625 includes components to determine the location, orientation, and ordinal direction of the mobile device 600, an example of which will be described in more detail below. The mobile device 600 includes an image capture module 630, such as a camera module as is commonly found on mobile telephones. A memory 635 is coupled to the controller module 615, and contains software code 640 that, when executed by the controller module 615, cause the controller module 615 to perform the various functions for obtaining images as described herein. A power source 645, such as rechargeable batteries, provides operating power to the components of mobile device 600. The mobile device 600 operates to run an application that allows a user to indicate that they desire to obtain one or more images at a particular location. In one example, the mobile device 600 runs an application that allows a user to use the image capture module 630 to view an image on the display of user interface module 620 and provide an indication that an image is to be taken. The mobile device 600 may capture the image, and also capture position information from the positioning module 625. The captured image, along with images from an image database such as described above, may be provided to the user. A set of images may also be provided to the mobile device 600 and the user may select one or more of the provided images for download, and provide any payment therefor, in a manner similarly as described herein. The mobile device 600 may also receive input from a user that an image preview is desired, such as depressing a button half-way or otherwise providing an indication that a preview is desired. An image preview may then be provided where the mobile device 600 downloads and displays images (such as low resolution images) having similar position information in a serial manner, and when the user releases the button (or provides other indication) a full resolution image is downloaded. If the user does not wish to download any images that are previewed, the user may fully depress the button (or provide other indication) to obtain their own image using the image capture module 630. The mobile device 600 may also, in certain situations, preemptively download images corresponding to the location of the device 600, in order to provide images to the user more quickly. Of course, such preemptive downloads can consume power and data transmission bandwidth to the device 600, and in some cases is enabled only during times when it is known that the user is likely to download a relatively large number of images, or when the user launches as application on the mobile device 600 to initiate image downloads.

The mobile device 600 may also be configured to receive an indication from a user that an image is desired without the user physically pointing the device 600 toward a particular object of interest. For example, a user may tap the device 600 three times while the device is located in the user's pocket, indicating that the user desires to obtain an image of the location. In such a case, the device 600 is not necessarily pointing at the scene the user wants an image of, e.g. the Washington Monument. In such a case, the device 600 may provide an indication to the image identification module (such as in FIG. 2) that the particular input was received (e.g., tapping three times) that indicates the user simply desires a common image of the particular location, and one or more images are provided based on the most common position information for that particular location. In other cases, the device 600 may still provide position information to the image identification module. In such cases, the image identification module may select which position information to through a search of the database and analysis of position information commonly used at that location. For example, if a search for images having particular position information might not yield any results, such as if the position information indicates the device is pointing in a direction where no, or very few, images have been taken. The image identification module in such a situation could determine that a large percentage of images at that location are taken in a particular direction and orientation, and provide such an image to the user. For example, if 45% of images available for a particular location were taken in same direction at that spot, such as toward the Eiffel tower versus bakery behind the user, the popular image may be provided to the user. In other cases, the user may be provided with both the less popular image, and the more popular image as well.

Figure 7:
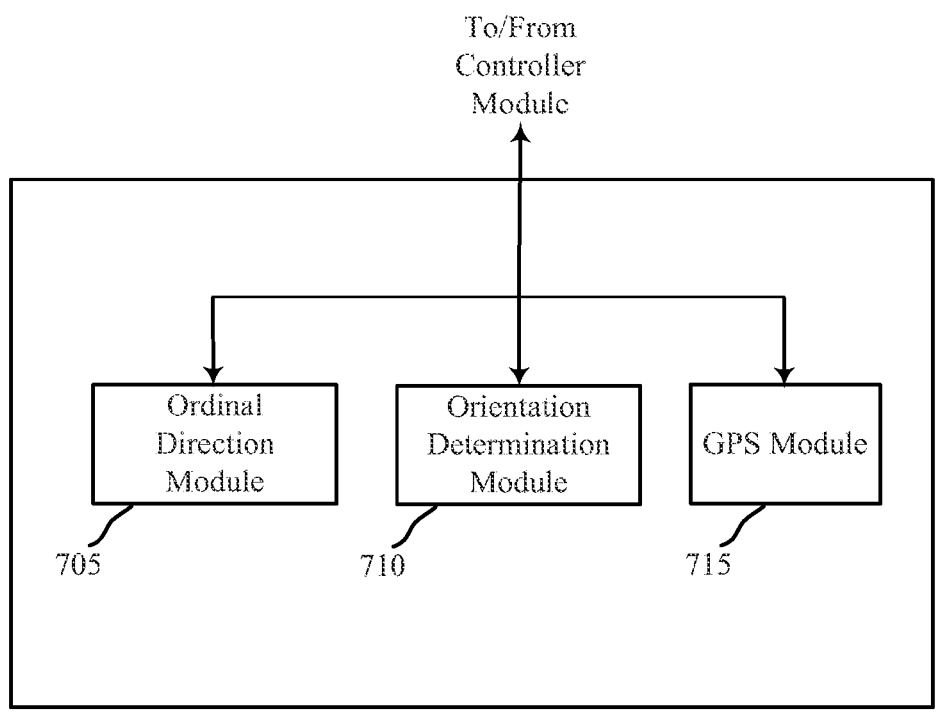
FIG. 7 shows a block diagram of an example of a positioning module.

With reference now to FIG. 7, an exemplary positioning module 700 is described. In FIG. 7, the positioning module 700 includes an ordinal direction module 705, that provides an ordinal direction of the device such as an angular direction relative to magnetic north. The ordinal direction module 705 may include any suitable device to provide such information, such as a magnetometer. An orientation determination module 710 provides an output that can be used to determine an orientation of the mobile device. The orientation determination module 710 may include any suitable component to provide such information, such as a three-axis accelerometer that provides an indication of gravitational forces that may be used to provide an orientation of the device relative to gravitational forces. Acceleration forces other than gravity may be detected and compensated using traditional techniques, such as acceleration forces that may be present in a moving vehicle. Positioning module 700 also includes a GPS module 715 that outputs location information in any of a number of well known formats, such as latitude and longitude information in WGS84 format. Of course, other modules may be used to determine location, which are well known, such as assisted GPS or other terrestrial and/or satellite-based systems. The positioning module 700 provides orientation, ordinal direction, and location information to the controller module of the mobile device.

Figure 8:
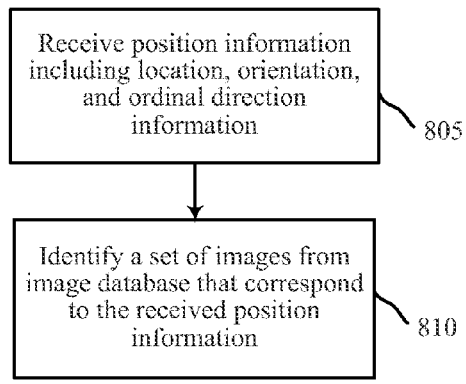
FIG. 8 is a flowchart of a method for identifying a set of images based on position information.

With reference now to FIG. 8, exemplary operational steps 800 for identifying a set of images are described. Initially, at block 805, position information including location, orientation, and ordinal direction information is received. A set of images from image database are identified that correspond to the received position information, as noted at block 810.

Figure 9:
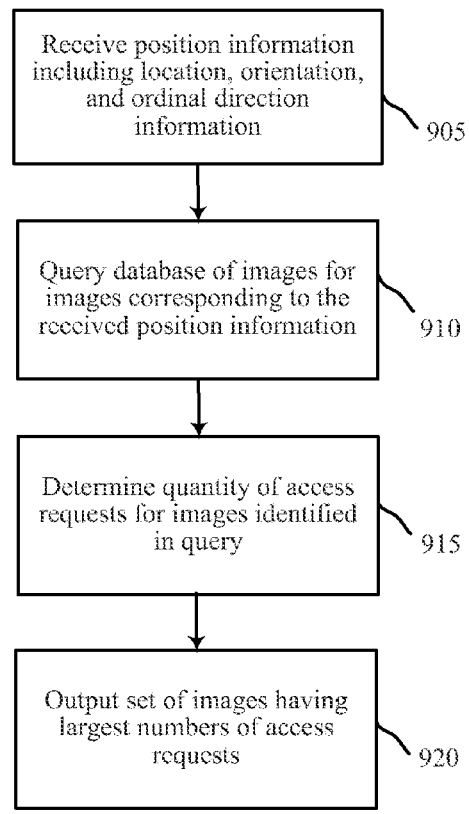
FIG. 9 is a flowchart of another method for identifying a set of images based on position information.

FIG. 9 illustrates another exemplary set of operational steps 900 for obtaining a set of images. Initially, at block 905, position information including location, orientation, and ordinal direction information is received. A database of images is queried for images corresponding to the received position information, at block 910. A quantity of access requests for images identified in query is determined, at block 915. The images having the highest quantity of access requests may indicate images that have good quality or other desirable characteristics. At block 920, a set of images having largest numbers of access requests are output.

Figure 10:
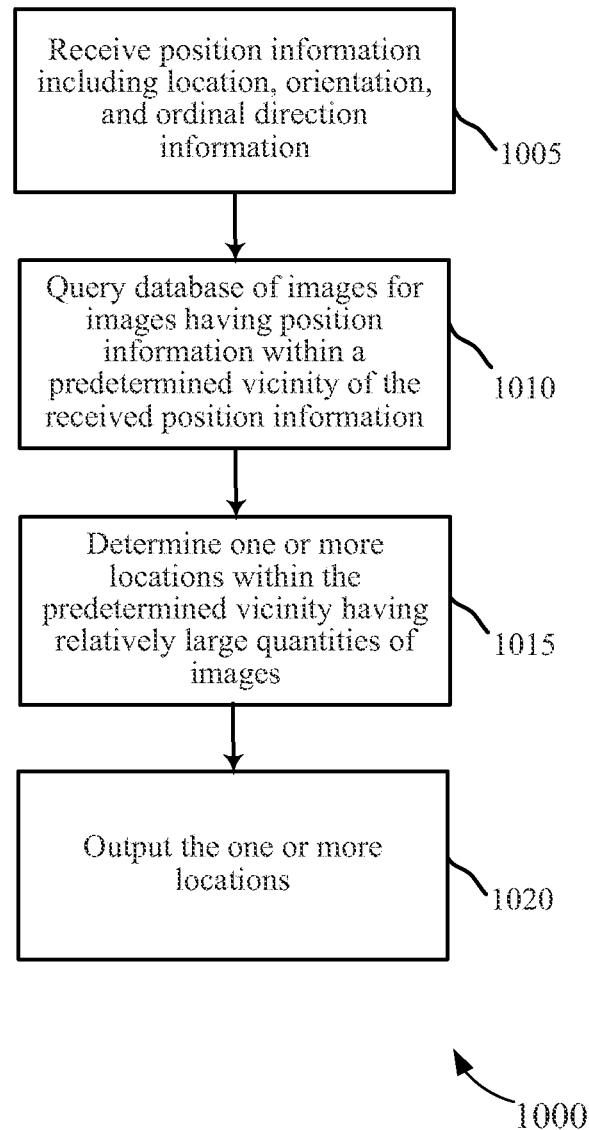
FIG. 10 is a flowchart of a method for providing location information to a user.

With reference now to FIG. 10, operational steps 1000 for identifying locations within a vicinity of a user that may be of interest to the user. At block 1005, position information including location, orientation, and ordinal direction information is received. A database of images is queried, at block 1010, for images having position information within a predetermined vicinity of the received position information. One or more locations within the predetermined vicinity having relatively large quantities of images are determined, according to block 1015. Finally, at block 1020, the one or more locations are output. In such a manner, a user of a mobile device, for example, may receive information related to nearby locations that may be of interest to the user based on the amount of activity of other users a the other locations. As mentioned above, the quantity of images may be based on images obtained by other users that also obtained images associated with the received position information, and/or may be based on real-time or near real-time activity of other users within the predetermined vicinity. The predetermined vicinity may be a selectable radius from a mobile that is used to determine position information, such as within one mile, or within two kilometers, for example.

Figure 11:
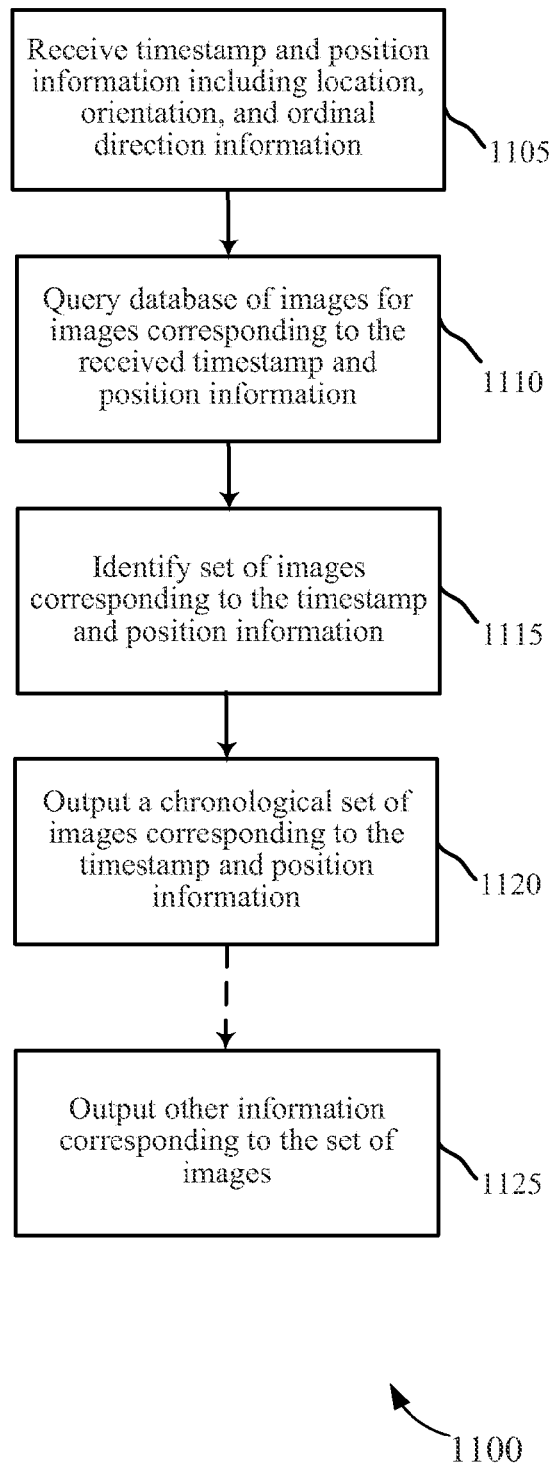
FIG. 11 is a flowchart of a method for providing images and other information associated with the images to a user.

FIG. 11 illustrates operational steps 1100 according to another example, in which a chronological set of images is output to a user. Initially, timestamp and position information is received, the position information including location, orientation, and ordinal direction information, as noted at block 1105. The timestamp information may simply be a time of receipt of the information, or may be a timestamp provided by a mobile device that is associated with the received position information. At block 1110, a database of images is queried for images corresponding to the received timestamp and position information. A set of images is identified that correspond to the timestamp and position information, at block 1115. The set of images may be a number of similar images that have timestamps according to seasons of the year, and/or may have timestamps that date back chronologically to provide a visual history of the scene contained in the images. A chronological set of images corresponding to the timestamp and position information is output according to block 1120. In optional block 1125, other information corresponding to the set of images is output. Such other information may include audio that accompanies the images, or information related to objects, individuals, or events depicted in the images, for example.

Figure 12:
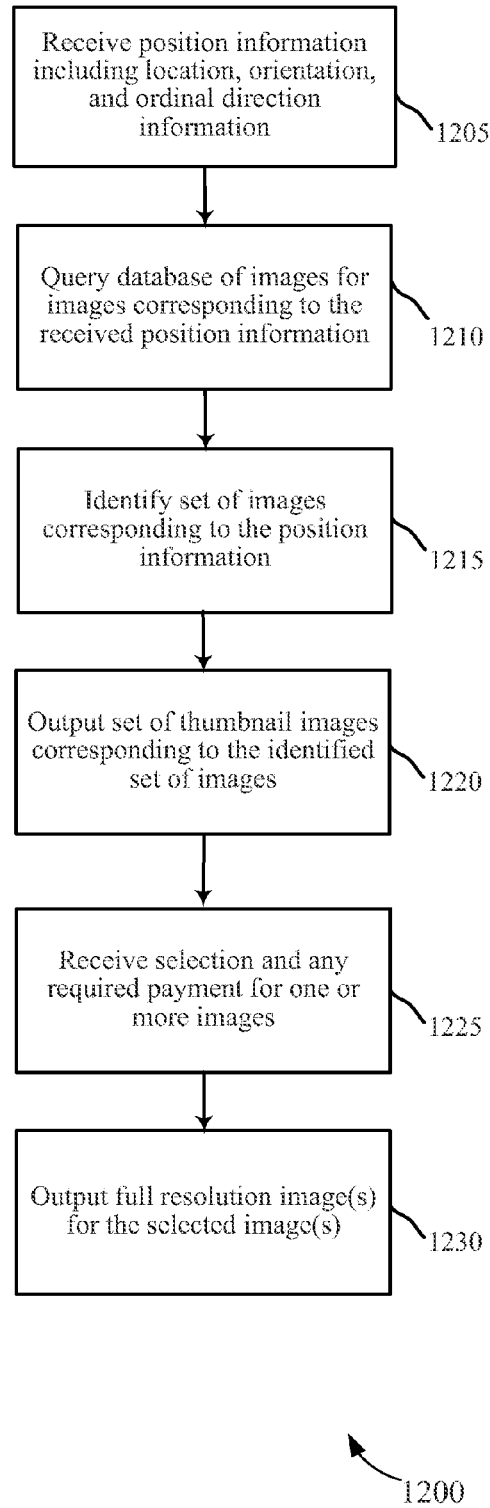
FIG. 12 is a flowchart of a method for providing images and payment for images.

With reference now to FIG. 12, a method 1200 is illustrated for outputting one or more images based on received position information. At block 1205, position information including location, orientation, and ordinal direction information is received. A database of images is queried for images corresponding to the received position information, as noted at block 1210. A set of images corresponding to the position information is identified at block 1215. The method, at block 1220, outputs a set of thumbnail images corresponding to the identified set of images. Selection of, and any required payment for, one or more of the thumbnail images is received at block 1225. Full resolution image(s) for the selected image(s) are then output, as noted at block 1230.

The detailed description set forth above in connection with the appended drawings describes exemplary implementations and does not represent the only examples that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts as described.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for identifying images using a wireless mobile device, comprising:
    receiving a set of data from the mobile device comprising position information including location information, an orientation of the mobile device indicating an amount of upward or downward orientation relative to a horizontal plane, and an ordinal direction of the mobile device; and
    identifying a set of images associated with the received position information from a data store of images, wherein identifying the set of images comprises selecting images from the data store of images based at least in part on a number of access requests for the images and at least one of a cost for download of the images, a resolution of the images, or a source of the images.

2. The method of claim 1, wherein the set of data further comprises a timestamp including a date and time associated with the position information, and wherein the set of images includes one or more images taken at a time similar to the time of the timestamp.

3. The method of claim 1, wherein the set of images includes one or more images from other locations in a vicinity of the location information.

4. The method of claim 3, further comprising:
transmitting other location information associated with the set of images to the mobile device.

5. The method of claim 4, wherein the transmitting comprises:
transmitting directions usable by a user of the mobile device to move to one of the other locations.

6. The method of claim 3, wherein identifying the set of images is based on position information received from other mobile devices in the vicinity of the location information.

7. The method of claim 1, wherein the set of images includes one or more images taken by a device having position information similar to the received position information.

8. The method of claim 1, wherein identifying the set of images comprises identifying a plurality of images from times different than a time of receipt of the set of data.

9. The method of claim 8, wherein the plurality of images include images associated with the position information in chronological order.

10. The method of claim 9, wherein the transmitting further comprises transmitting audio associated with the chronological order of the images.

11. The method of claim 1, wherein the mobile device includes an image capture module, and wherein the receiving further includes receiving a captured image from the image capture module, and wherein the identifying the set of images is further based on the captured image.

12. The method of claim 1, further comprising transmitting the set of images to a user of the mobile device.

13. The method of claim 12, wherein transmitting the set of images comprises transmitting one or more images to one or more of a personal video recorder, personal computer, social networking account, or mobile device associated with the user of the mobile device.

14. The method of claim 12, wherein transmitting the set of images comprises transmitting a set of low resolution images to the user of the mobile device, and wherein the method further comprises:
receiving a selection of one or more of the set of low resolution images; and
transmitting full resolution images of the one or more selected images.

15. The method of claim 14, wherein the set of low resolution images include cost information, and receiving the selection comprises receiving payment of the cost of the selected one or more image.

16. An apparatus for identifying images to a user of a wireless mobile device, comprising:
a network interface module configured to:
receive a set of data from the mobile device comprising position information including location information, an orientation of the mobile device indicating an amount of upward or downward orientation relative to a horizontal plane, and an ordinal direction of the mobile device;
an image database comprising a plurality of images having associated position information;
an image identification module communicatively coupled with the network interface module and image database, and configured to identify a set of images in the image database that correspond to the received position information and to select images from the image database based at least in part on a number of access requests for the images and at least one of a cost for download of the images, a resolution of the images, or a source of the images.

17. The apparatus of claim 16, wherein the set of images includes one or more images taken by a device having position information similar to the received position information.

18. The apparatus of claim 16, wherein the set of data further comprises a timestamp including a date and time associated with the position information, and wherein the set of images includes one or more images taken at a time similar to the time of the timestamp.

19. The apparatus of claim 16, wherein the set of images includes one or more images from other locations in a vicinity of the location information.

20. The apparatus of claim 19, wherein the image identification module is further configured to transmit other location information associated with the set of images to the mobile device.

21. The apparatus of claim 19, wherein the network interface module is further configured to receive at least a second set of data from a second mobile device, and wherein the image identification module is further configured to identify the set of images based on position information received from the second mobile device.

22. The apparatus of claim 16, wherein the set of images comprises a plurality of images from times different than a time of receipt of the set of data.

23. The apparatus of claim 22, wherein the plurality of images include images associated with the position information in chronological order.

24. The apparatus of claim 23, wherein the image identification module is further configured to transmit audio associated with the chronological order.

25. The apparatus of claim 16, wherein the network interface module is further configured to receive a captured image from an image capture device associated with the mobile device, and wherein the image identification module is further configured to identify the set of images based on the captured image.

26. The apparatus of claim 16, wherein the network interface module is further configured to receive an image from an image capture device associated with the mobile device, and store the received image in the image database.

27. The apparatus of claim 26, wherein the image database, when an image is stored, is configured to remove images based on one or more of an age of the image, a number of downloads of the image, and a total number of similar images contained in the image database.

28. The apparatus of claim 16, wherein the image identification module is further configured to transmit information related to the set of images to the user of the mobile device.

29. The apparatus of claim 28, wherein the information related to the set of images comprises a set of thumbnail images, and wherein the network interface module is further configured to receive a selection of one or more of the images, and wherein the image identification module is further configured to transmit full resolution images of the one or more selected images.

30. The apparatus of claim 29, wherein the information related to the set of images further comprises cost information, and the network interface module is further configured to receive a payment of the cost of the selected one or more image.

31. A method for identifying images using a wireless mobile device, comprising:
transmitting, from the mobile device, a set of data comprising position information including location information, an orientation of the mobile device indicating an amount of upward or downward orientation relative to a horizontal plane, and an ordinal direction of the mobile device; and receiving identification of a set of images associated with the transmitted position information, wherein the set of images comprises images selected from a data store of images based at least in part on a number of access requests for the images and at least one of a cost for download of the images, a resolution of the images, or a source of the images.

32. The method of claim 31, wherein the set of images includes one or more images taken by a device having position information similar to the transmitted position information.

33. The method of claim 31, wherein the set of data further comprises a timestamp including a date and time associated with the position information, and wherein the set of images includes one or more images taken at a time similar to the time of the timestamp.

34. The method of claim 31, further comprising receiving, at the mobile device, information related to a second location in a vicinity of the location information of the mobile device, corresponding to one or more images in the set of images.

35. The method of claim 31, wherein the set of images comprises a plurality of images from times different than a time of transmission of the set of data.

36. The method of claim 35, further comprising displaying, at the mobile device, the plurality of images in chronological order.

37. The method of claim 36, further comprising playing, at the mobile device, audio associated with the plurality of images.

38. The method of claim 31, further comprising receiving, at the mobile device, a set of low resolution images corresponding to the set of images, and wherein the method further comprises:

receiving a selection of one or more of the images;
transmitting full resolution images of the one or more selected images; and
capturing an image from an image capture module of the mobile device when the selection of one or more of the images is not received.

39. A mobile device, comprising:

a positioning module configured to determine a location, an ordinal direction, and an orientation of the mobile device indicating an amount of upward or downward orientation relative to a horizontal plane; and a controller module communicatively coupled to the positioning module that is configured to transmit a set of data comprising position information including location information, the orientation of the mobile device, and the ordinal direction of the mobile device, and further configured to receive identification of a set of images associated with the transmitted position information from a data store of images, wherein the set of images comprises images selected from the data store of images based at least in part on a number of access requests for the images and at least one of a cost for download of the images, a resolution of the images, or a source of the images.

40. The mobile device of claim 39, wherein the controller module is further configured to monitor an output of the positioning module and transmit the set of data when a predefined motion of the mobile device is detected.

41. The mobile device of claim 39, wherein the controller module is further configured to receive configuration information related to the mobile device that identifies a particular portion of the mobile device as the front of the mobile device, and wherein the controller module is further configured to transmit the orientation of the mobile device and the ordinal direction of the mobile device based on the configuration information.

42. The mobile device of claim 39, wherein the set of images includes one or more images taken by a device having position information similar to the transmitted position information.

43. The mobile device of claim 39, wherein the controller module is further configured to receive information related to a second location in a vicinity of the location of the mobile device, corresponding to one or more images in the set of images.

44. The mobile device of claim 39, wherein the set of images comprises a plurality of images from times different than a time of transmission of the set of data, and the mobile device further comprises a display configured to display the plurality of images in chronological order.

45. The mobile device of claim 39, wherein the controller module is further configured to receive one or more images of the set of images independently of a request from a user to receive the one or more images.

46. A system for identifying images using a wireless mobile device, comprising:

means for receiving a set of data from the mobile device comprising position information including location information, an orientation of the mobile device indicating an amount of upward or downward orientation relative to a horizontal plane, and an ordinal direction of the mobile device; and means for identifying a set of images associated with the received position information from a data store of images, wherein identifying the set of images comprises selecting images from the data store of images based at least in part on a number of access requests for the images and at least one of a cost for download of the images, a resolution of the images, or a source of the images.

47. The system of claim 46, wherein the set of images includes one or more images taken by a device having position information similar to the received position information.

48. The system of claim 46, wherein the set of images includes one or more images from other locations in a vicinity of the location information that may be of interest to a user of the mobile device.

49. The system of claim 46, wherein the means for identifying the set of images comprises means for identifying a plurality of images from times different than a time of receipt of the set of data.

50. A non-transitory computer readable medium encoding a computer program product comprising:

code for receiving a set of data from a mobile device comprising position information including location information, an orientation of the mobile device indicating an amount of upward or downward orientation relative to a horizontal plane, and an ordinal direction of the mobile device; and code for identifying a set of images associated with the received position information from a data store of images, wherein identifying the set of images comprises selecting images from the data store of images based at least in part on a number of access requests for the images and at least one of a cost for download of the images, a resolution of the images, or a source of the images.

51. The computer program product of claim 50, wherein the set of images includes one or more images taken by a device having position information similar to the received position information.

52. The computer program product of claim 50, wherein the set of images includes one or more images from other locations in a vicinity of the location information.

53. The computer program product of claim 50, wherein the code for identifying the set of images comprises code for identifying a plurality of images from times different than a time of receipt of the set of data.

\* \* \* \* \*